(12) United States Patent
Chen et al.

(10) Patent No.: US 11,921,631 B2
(45) Date of Patent: Mar. 5, 2024

(54) DEDICATED BOUND INFORMATION REGISTER FILE FOR PROTECTING AGAINST OUT-OF-BOUNDS MEMORY REFERENCES

(71) Applicant: International Business Machines Corporation, Armonk, NY (US)

(72) Inventors: Tong Chen, Yorktown Heights, NY (US); Alper Buyuktosunoglu, White Plains, NY (US); Richard H. Boivie, Monroe, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/137,666

(22) Filed: Dec. 30, 2020

(65) Prior Publication Data

US 2022/0206943 A1 Jun. 30, 2022

(51) Int. Cl.
*G06F 12/08* (2016.01)
*G06F 9/30* (2018.01)
*G06F 12/0802* (2016.01)

(52) U.S. Cl.
CPC ........ *G06F 12/0802* (2013.01); *G06F 9/3001* (2013.01); *G06F 2212/1021* (2013.01)

(58) Field of Classification Search
CPC .................................................. G06F 12/0802
USPC ......................................................... 711/118
See application file for complete search history.

(56) References Cited

U.S. PATENT DOCUMENTS

| | | | | |
|---|---|---|---|---|
| 5,546,561 A | * | 8/1996 | Kynett | G11C 16/3459 711/163 |
| 6,662,268 B1 | * | 12/2003 | McBrearty | G06F 11/2082 711/111 |
| 8,635,415 B2 | | 1/2014 | Patel et al. | |
| 9,535,613 B2 | | 1/2017 | Yazdani et al. | |
| 2001/0007538 A1 | * | 7/2001 | Leung | G11C 11/406 711/E12.041 |
| 2007/0143555 A1 | * | 6/2007 | Nemiroff | G06F 21/805 711/163 |
| 2011/0078389 A1 | | 3/2011 | Patel | |
| 2016/0147466 A1 | * | 5/2016 | Yazdani | G06F 9/3004 711/154 |

(Continued)

FOREIGN PATENT DOCUMENTS

CN 112149114 A 12/2020
CN 114691543 A 7/2022

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Jae U Yu
(74) *Attorney, Agent, or Firm* — Robert D. Bean

(57) ABSTRACT

A method, system and apparatus for protecting against out-of-bounds references, including storing an address of a buffer in a general register and storing bounds information (BI) for the buffer in a bounds information register, and when a content of the general register is used as an address in a load or store operation, using a content of the bounds information register to determine if the load or store is out of bounds.

20 Claims, 17 Drawing Sheets

(56) References Cited

U.S. PATENT DOCUMENTS

2018/0089007 A1 3/2018 Gottschlich
2019/0121716 A1 4/2019 Kurmus

FOREIGN PATENT DOCUMENTS

| DE | 102021131418 A1 | 6/2022 |
| GB | 2605678 A | 10/2022 |
| JP | S61228539 A | 10/1986 |
| JP | 2022104879 A | 7/2022 |

OTHER PUBLICATIONS

Ronald Gil, et al, "There's a Hole in the Bottom of the C: on the Effectiveness of Allocation Protection" MIT CSAIL Cambridge, MA.

Intel MPX Explained: "A Cross-layer Analysis of the Intel MPX System Stack" https://Intel-MPX.github.io/.

Disclosed Anonymously, et al. "Method and Apparatus for Memory Shmooing" IP.com No. IPCOM000216652D, Apr. 11, 2012.

Disclosed Anonymously, et al., "Set up Data Access Break Register to detect Stack Overflow", IP.com No. IPCOM000257394D, Feb. 8, 2019.

Nagarakatte, S. et al.; "Softbound: Highly Compatible and Complete Spatial Memory Safety for C"; 2009, University of Pennsylvania.

Intel MPX Explained: Oleksii Oleksenko, et al. "A Cross-layer Analysis of the Intel MPX System Stack", https://Intel-MPK.github.io/ ACM Meas., Anal. Computer System, vol. 2, No. 2, Article 28, Jun. 2018.

Shao, Z et al.; "Efficient Array & Pointer Bound Checking Against Buffer Overflow Attacks via Hardware/Software".

UK Response to Examination, dated Aug. 2, 2022, in UK Patent Application No. 2117483.4.

* cited by examiner

FIG. 5

Create BI instruction 370

```
createBI Rp, Rs, Rl, tag:
// Rp for pointer, Rs (starting address) and Rl (length) for BI
// tag for hint for where to create the entry if (tag == 0 && allocate an entry in the index table ) {
    mybits = the index of this entry;
    store Rs and Rl in this entry;
    Rp=set_index_bits(Rp, mybits);
} else {
    allocate an entry in the value/key table;
    Rp = set_index_bits(Rp, INDEX_NA);
    store Rp, Rs and Rl to the entry ;
    store Rs and Rl to FB(Rp); //Bp is bound register
}
```

FIG. 7A

```
obj* a[10]
mv p, @a
createBI p, p, @a+79, 0          ← 406
for (i=0; i<M; i++):
  ai = p + i
  load* objptr , ai              ← 408
  lenptr = objptr + 100
  load len lenptr
```

```
struct obj { char buf[100]; int len }
obj* a[10]
for (i=0; i<M; i++):
  ai = a + i
  objptr = load ai
  lenptr = objptr + 100
  len = load lenptr
```

FIG. 7B

Source code

```
struct obj { char buf[100]; int len }
obj* a[10]
for (i=0; i<M; i++):
  ai = a + i
  objptr = load ai
  lenptr = objptr + 100
  len = load lenptr
```

Pseudo code with MPX

```
obj* a[10]
a_b = bndmk a, a+79
for (i=0; i<M; i++):
  ai = a + i
  bndcl a_b, ai
  bndcu a_b, ai+7
  objptr = load ai
  objptr_b = bndldx ai
  lenptr = objptr + 100
  bndcl objptr_b, lenptr
  bndcl objptr_b, lenptr +3
  len = load lenptr
```

Store instruction 412

```
store Ra, Rv    // store Rv to address Ra

//check bound of address for store
a_bits = get_index_bits(Ra);
real_a = set_index_bits(Ra, 0);

if (a_bits == INDEX_NA ) {
      checkBI real_a, FB(Ra); //FB(Ra):Bound Register
} else {
      t = real_load BITable[a_bits]  //load BI
      checkBI real_a, t
}
```

414 →

```
//do real store
real_store real_a, Rv

//store bound information of the value if needed
if (store is marked as pointer store by compiler &&
    get_index_bits(Rv) == INDEX_NA) {
      //store BI (bound information)
      write FB(Rv) to value/key table with Rv as
the key ;
}
```

FIG. 10B when a buffer is allocated, storing an address of the buffer in a general purpose register and storing bounds information (BI) for the buffer in a bounds information register 510

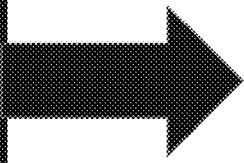

when the content of the general purpose register is used as an address in a load or store operation, using the content of the bounds information register to determine if the load or store is out of bounds 512

100

DEDICATED BOUND INFORMATION REGISTER FILE FOR PROTECTING AGAINST OUT-OF-BOUNDS MEMORY REFERENCES

CROSS REFERENCE TO RELATED APPLICATIONS

The present application is a related Application of co-pending U.S. patent application Ser. No. 17/137,708, which is filed on Dec. 30, 2020, and U.S. patent application Ser. No. 17/071,257, which was filed on Oct. 15, 2020, the entire contents of which are incorporated herein by reference.

BACKGROUND

The present invention relates to an embodiment of a method, apparatus, and system for a bound information register file, and more particularly, but not by way of limitation, relates to a method, apparatus, and system for using dedicated bound information register file for protecting against out-of-bounds memory references.

Memory safety vulnerabilities (e.g., buffer overflow, null pointer, heap corruption, use after free, or double free, etc.) happen when software, accidentally or intentionally, accesses system memory in a way that exceeds its allocated size and memory addresses.

Programs such as C and C++, which have been used extensively in certain operating systems and other programs, can lead to a plurality of memory safety errors that attackers can exploit with dangerous and intrusive consequences, such as remote code execution or elevation of privilege flaws, etc. For example, by reading out-of-bounds memory, an attacker might be able to bypass memory protections and get secret values.

Therefore, there is a need to have techniques that can reduce or eliminate memory safety vulnerabilities in an efficient manner.

SUMMARY

In view of the foregoing and other problems, disadvantages, and drawbacks of the aforementioned background art, an exemplary aspect of the disclosed invention provides a method, apparatus, and system for dedicated bound information register file for protecting against out-of-bounds memory references.

An embodiment of the present invention, a method for protecting against out-of-bounds references, including storing an address of a buffer in a general register and storing bounds information (BI) for the buffer in a bounds information register, and when the content of the general register is used as an address in a load or store operation, using the content of the bounds information register to determine if the load or store is out of bounds.

An embodiment of the present invention, a system for protecting against out-of-bounds references, including storing an address of a buffer in a general register and storing bounds information (BI) for the buffer in a bounds information register, and when the content of the general register is used as an address in a load or store operation, using the content of the bounds information register to determine if the load or store is out of bounds.

Another embodiment of the present invention, a computer program product comprising a computer readable storage medium having program instructions embodied therewith, the program instructions readable and executable by a computer to cause the computer to perform a method for protecting against out-of-bounds references, including storing an address of the buffer in a general register and storing bounds information (BI) for the buffer in a bounds information register, and when the content of the general register is used as an address in a load or store operation, using the content of the bounds information register to determine if the load or store is out of bounds.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 5 illustrates an example creation of BI instruction of an embodiment of the present invention.

FIG. 7A illustrates how an application could be modified to include protection against out-of-bounds memory references according to an embodiment of the present invention.

FIG. 7B illustrates how an application could be modified to include protection against out-of-bounds memory references using INTEL MPX.

FIG. 8 illustrates an example store instruction of an embodiment of the present invention.

FIG. 10B illustrates a method of an embodiment of the present invention.

DETAILED DESCRIPTION

Figure 1:
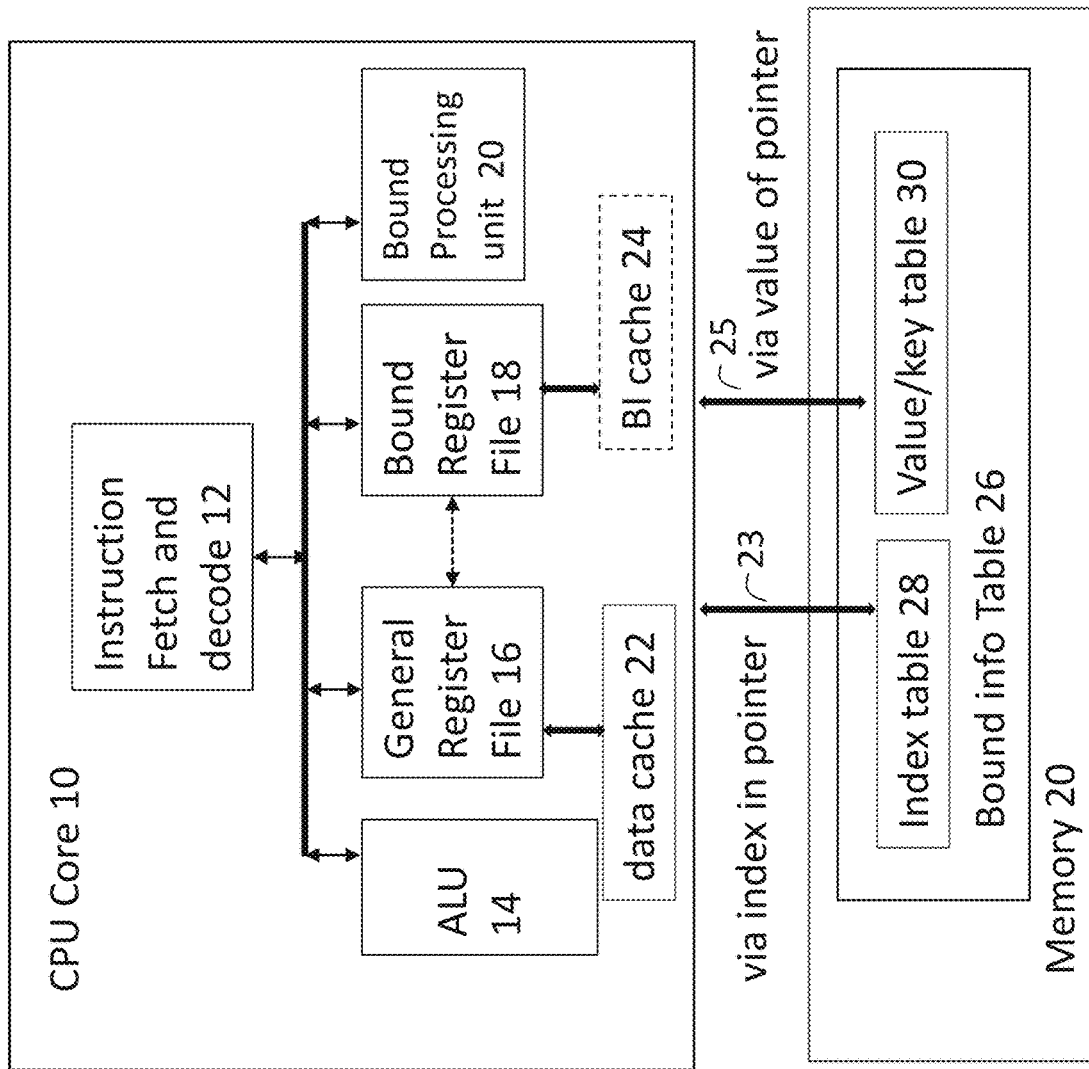
FIG. 1 illustrates an example system of an embodiment of the present invention.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures and embodiments shown can be modified or combined.

Memory references that are out of its bound may cause serious security problems. It is important to check whether each memory reference, load or store, is within its memory boundary. One existing solution is INTEL's Memory Protection (MPX) system. MPX introduced new ISA (instruction set architecture) and hardware support for precise bound check. In memory, bound information (BI) for each buffer is stored/retrieved with pointer value as key. In the core, pointer and its BI are in registers and mapping is maintained with extra instructions added by the compiler. Original computation and bound protection operation share the same hardware resource. There are other methods that attempt to remove or reduce memory safety vulnerabilities. However, all these other solutions have one major problem of needing a plurality of instructions to be added and also costly implementation. As a result, the number of instructions may increase four or more times and the execution time can be increased to two or more times even when the bound checking is turned off.

The present invention solves the above-mentioned problems with memory safety vulnerabilities and without issues of increasing the number of instructions like previous solutions. In general, the present invention introduces a dedicated register file to hold bound information for active pointers, which are in general registers. The present technique also maintains a mapping from the general register to the bound register so that the bound-checking related operation can be performed with the original instructions. The number of instructions to be added for bound checking will be greatly reduced. Also, special hardware is added to execute the bound checking related operations for instructions. Additionally, with bound information registers, the latency of most instructions will not increase when bound checking operation is added to them.

The present invention provides precise protection where it protects every buffer and precision to the byte. The present system is applicable on C/C++ applications and other programs that may have memory issues, where there is arbitrary pointer arithmetic, and number of buffers to be protected in one application may range from thousands to millions.

FIG. 1 illustrates an example system of an embodiment of the present invention. The system 100 includes a CPU (central processing unit) core 10 and a memory 20. The CPU Core 10 includes an instruction fetch and decode 12, ALU (arithmetic logic unit) 14, general register file 16, bound register file 18, bound processing unit 20. The general register file communicates with the data cache 22, while the bound register file 18 is connected with the bound information (BI) cache 24. BI information can be cached within hardware organization 100 in a dedicated cache (BI Cache 24). The BI cache 24 limits any slowdown from access to the BI table 26 in memory 20.

The memory 20 includes the bound information table 26 which includes the index table 28 and the value/key table 30. Therefore, the Bound information (BI) table 26 is in memory 20.

The CPU Core 10 communicates information with the Index table 28 and the Value/key table 30. The CPU Core 10 provides via index in a pointer (path 23) data to the index table 28, while providing data via value of the pointer (path 25) to the value/key table 30.

The bound information (BI) includes a start address and length for each buffer. The Index table 28 includes access by index. The value/key table 30 includes access with pointer value as the key. Instruction execution in the CPU Core 10 includes BI registers 18 to hold the bound information. The system 100 maintains a mapping between a general register in general register file 16 and a bound information register in the bound register file 18. The bound information for the pointer in the register file 18 can be located from original instructions. The bound processing unit executes operations for bound protection.

The bound register file 18 is further detailed as follows. A register in the bound register file 18 (e.g., 128 bits,) stores bound information including a start address and length, of a buffer. The system 100 guarantees that the BI of a pointer in register 18 can be found via a mapping, say FB:

$FB(R_n)=B_m$: means the BI for pointer in general register $R_n$ is in bound register $B_m$.

Such mapping allows that bound information can be accessed via pointer register. The system 100 does not use a separate instruction to operate on bound information as seen in MPX. An extra register address can be added to previous instructions.

One proposed implementation of the map FB: shadow of general registers $$FB(R_n)=B_n.$$

The number of bound registers 18 is the same number as the number general registers 16, or it can be reduced if the compiler only uses a subset of general registers 16 for pointers. The system 100 propagates BI along pointer arithmetic (e.g. add $R_i$, $R_j$, $R_k$) while a compiler marks which operand is a pointer, ($R_k$ is a pointer). The BI is copied (from $B_k$ to $B_i$).

The bound Information (BI) table 26 is further detailed as follows. The BI table 26 contains at least two sub-tables including an index table 28 and the value/key table 30.

Figure 2:
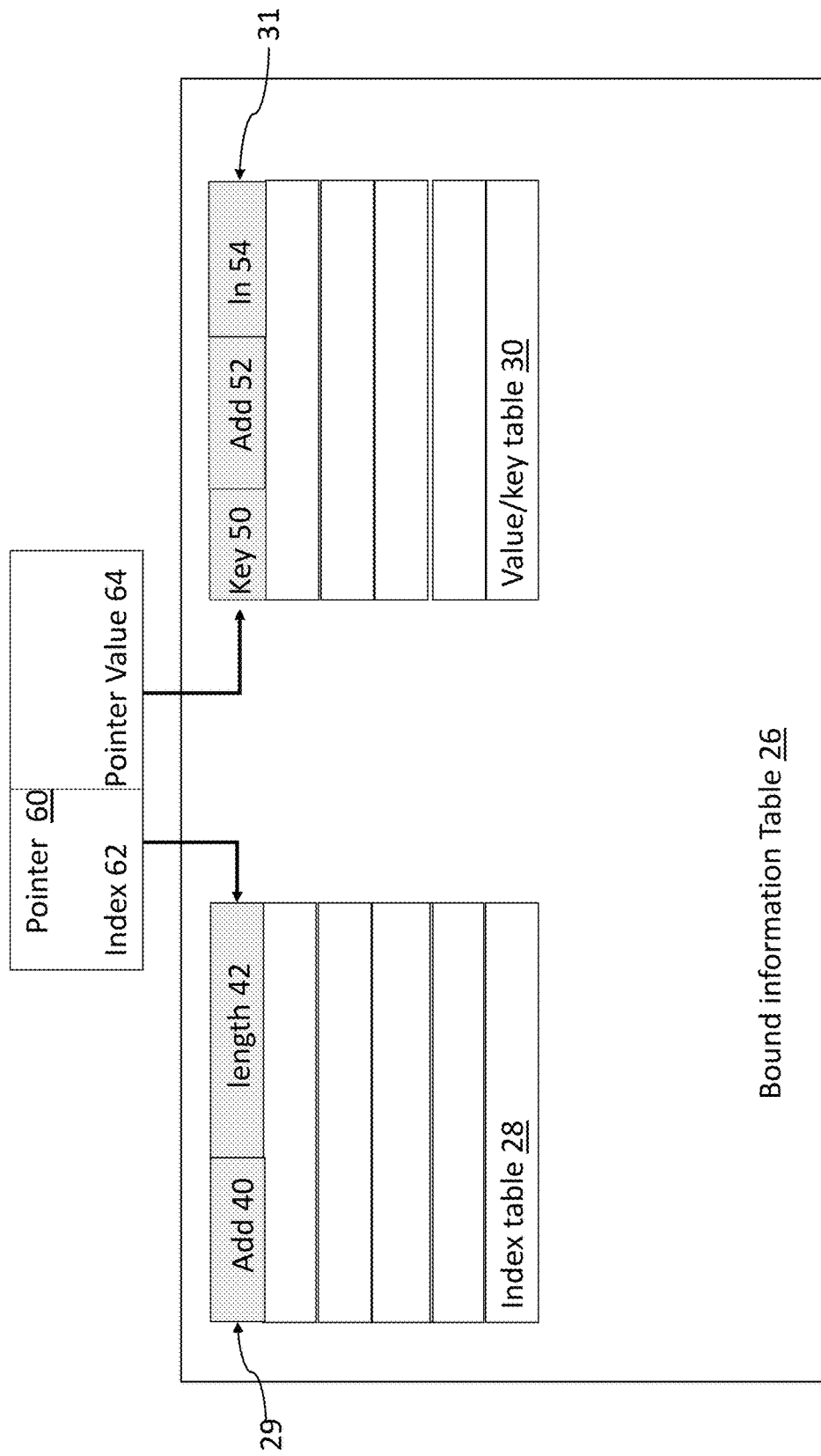
FIG. 2 illustrates a bound information table.

FIG. 2 illustrates a bound information table 26. In the Index table 28, each entry contains starting address 40 and length 42 of the buffer. Each entry in the Value/key table 30 includes a pointer value (key) 50, starting address 52 and length of the buffer 54. The value/key table 30 can grow when needed and is looked up by a pointer value. The pointer value (key) 50 can be obtained from the pointer value 64 of a pointer 60. The index 62 of the pointer 60 can be used to obtain the entries of the index table.

The Index table 28 can be organized as a linear table including a plurality of BI entries 29 with each BI entry including a base-address field 40 and an object-size or length field 42. Each BI entry 29 of Index table 28 can be associated with a heap object. Accessing a particular BI entry 29 of index table 28 corresponding to a given object can involve a single table-lookup. The single table-lookup can involve using an index 62 that can be embedded into a pointer 60 during object allocation.

Member functions or micro-instructions are as follows:
Void initialize (long long int bit_mask): set up the index bits mapping from bit_mask, and allocate space for index table and value/key table
unsigned long long int get_index_bits (void *addr): return the unsigned value represented by the index bits in pointer address
Void *set_index_bits (void *addr, unsigned int v): return the address with index bits set to value v
Constant INDEX_NA: all ones 11 . . . 1//index is not available for this pointer
Functions, get_index_bits and set_index_bits, should be supported directly with hardware.

Figure 3:
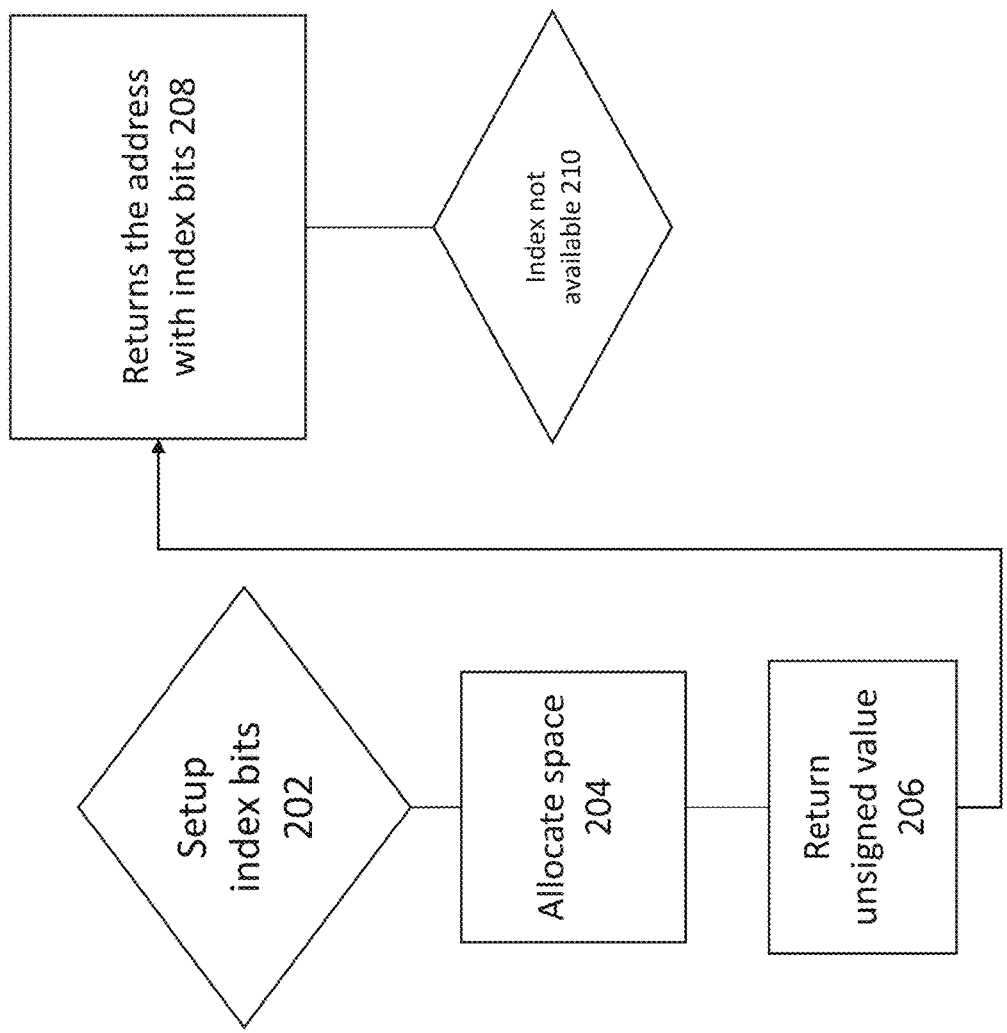
FIG. 3 illustrates a method for a bound information table.

FIG. 3 illustrates a method for a bound information table.

The system 100 can set up the index bits mapping from a bit_mask 202, and allocate space for index table 28 and value/key table 30 at step 204. Steps 202 and 204 can be performed with the above instructions, "Void initialize (long long int bit_mask)".

Then the system 100 returns the unsigned value represented by the index bits 62 in pointer address 206. Then the system 100 returns the address with index bits 62 set to value v at step 208. The, Constant INDEX_NA: all ones 11 . . . 1, where the index is not available for this pointer in step 210. Functions, at steps 206 ("get_index_bits") and 208 ("set_index_bits"), should be supported directly with hardware.

Figure 4:
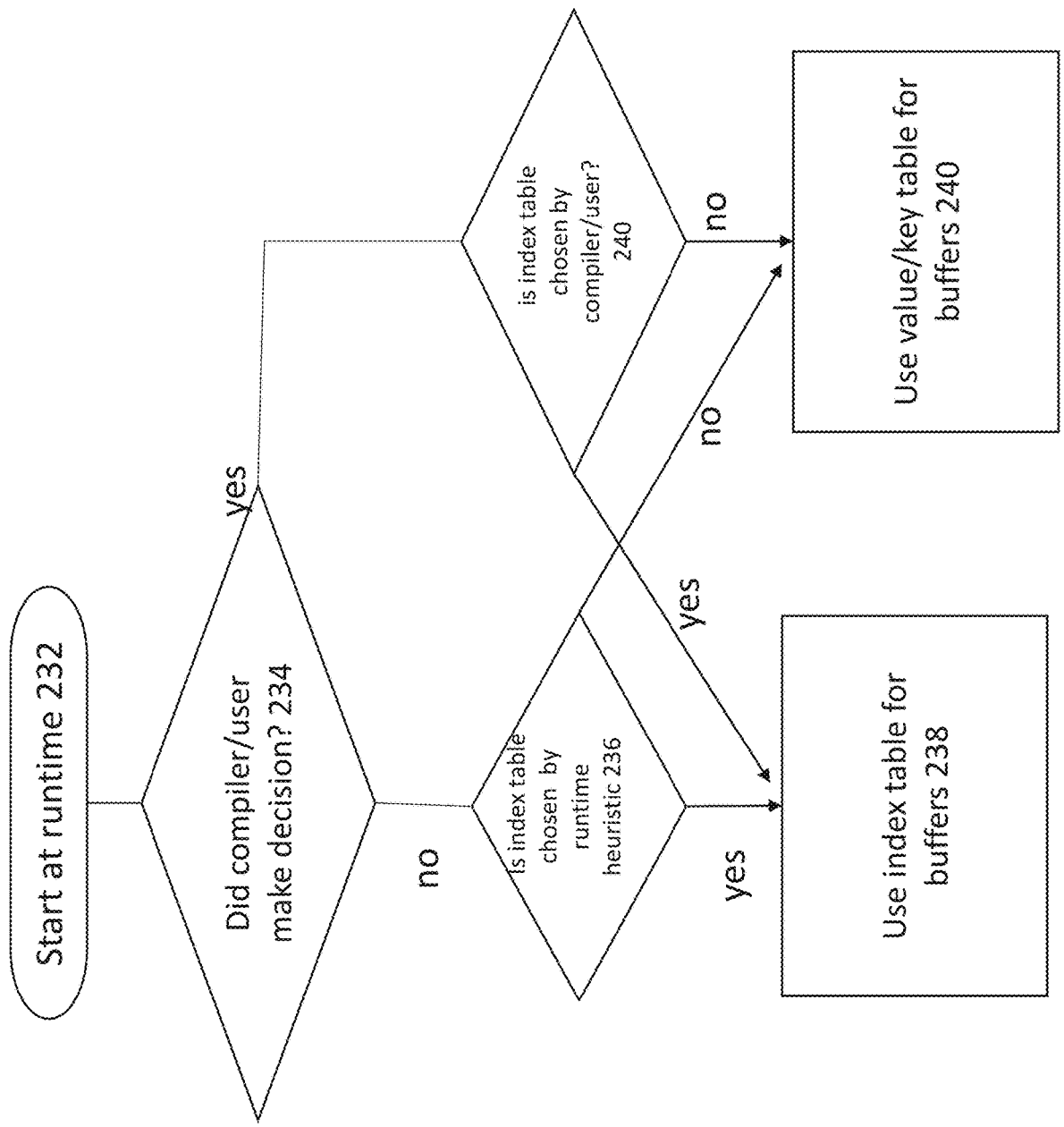
FIG. 4 illustrates how to choose between two BI tables of the index table and the value/key table in an embodiment of the present invention.

FIG. 4 illustrates how to choose between two BI tables of the index table 28 and the value/key table 30 in an embodiment of the present invention.

Choosing or selecting between the two BI tables 26 of the index table 28 and the value/key table 30 can be decided at runtime based on resource availability (index bits) 62 (step 232). The binary code is the same.

The system 100 provides control for compiler/user by allowing which bound information table 26 (the index table 28 or the value/key table 30) to use when possible and reserve entries in index table 28 for future buffer allocation.

The system 100 determines whether a caller (compiler/user) makes a decision in step 234. If the decision is "yes" at step 234, then the system 100 determines whether the index table 28 is chosen by the compiler/user (caller) at step 240. If decision is "no" at step 240, the system 100 uses the value/key table 30 for the buffers. If the decision is "yes" at step 240, the system 100 uses an index table 28 for the buffers 238.

If the decision is "no" at step 234, then the system 100 determines whether the index table 28 is chosen by runtime heuristics 236. If the decision is "no" at step 236, then the system 100 uses value/key table 30 for buffers 242. If the decision is "yes" at step 236, then the system 100 uses the index table 28 for buffers 238.

As shown above a selection there can be a simple or complex method used. The simple strategy would be to use the index table 28 first. The system 100 can use the index table 28 for buffers whose pointers themselves involves many load/stores. The system 100 can force usage of index table 28 for pointers that will go through type conversion in step.

FIG. 5 illustrates an example creation of BI instruction 370 of an embodiment of the present invention.

Figure 6:
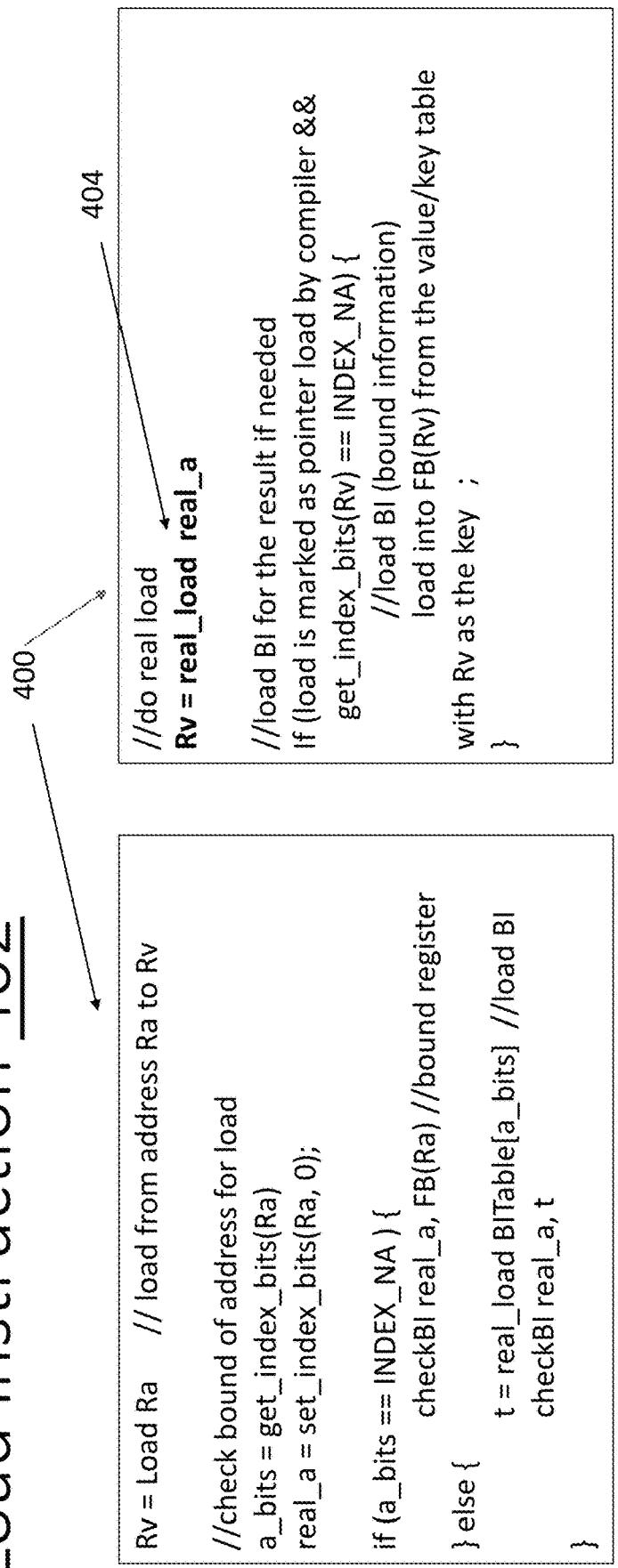
FIG. 6 illustrates an example load instruction of an embodiment of the present invention.

FIG. 6 illustrates an example load instruction 402 of an embodiment of the present invention. Note that the bound protection operations 400 (not in bold 404) is designed in such a way that allows them to be enabled or disabled at run-time.

FIG. 7A illustrates how an application could be modified to include protection against out-of-bounds memory references according to an embodiment of the present invention. There are much less instructions than other schemes such as MPX, and the same code is used no matter which BI table 26 is used. The changes also include the "createBI p, p, @a+79, 0" (406) to create the bound information table 26. Also, the "load*" at 408 indicates the load of the pointer.

FIG. 7B illustrates how an application could be modified to include protection against out-of-bounds memory references using INTEL MPX. As seen in underlined and bolded lines of instructions 409, the number of instructions has increased tremendously if MPX was used instead of the present invention.

FIG. 8 illustrates an example store instruction 412 of an embodiment of the present invention. Note that the bound protection operations (not in bold instruction 414) is designed in such a way that allows them to be enabled or disabled at run-time.

Figure 9:
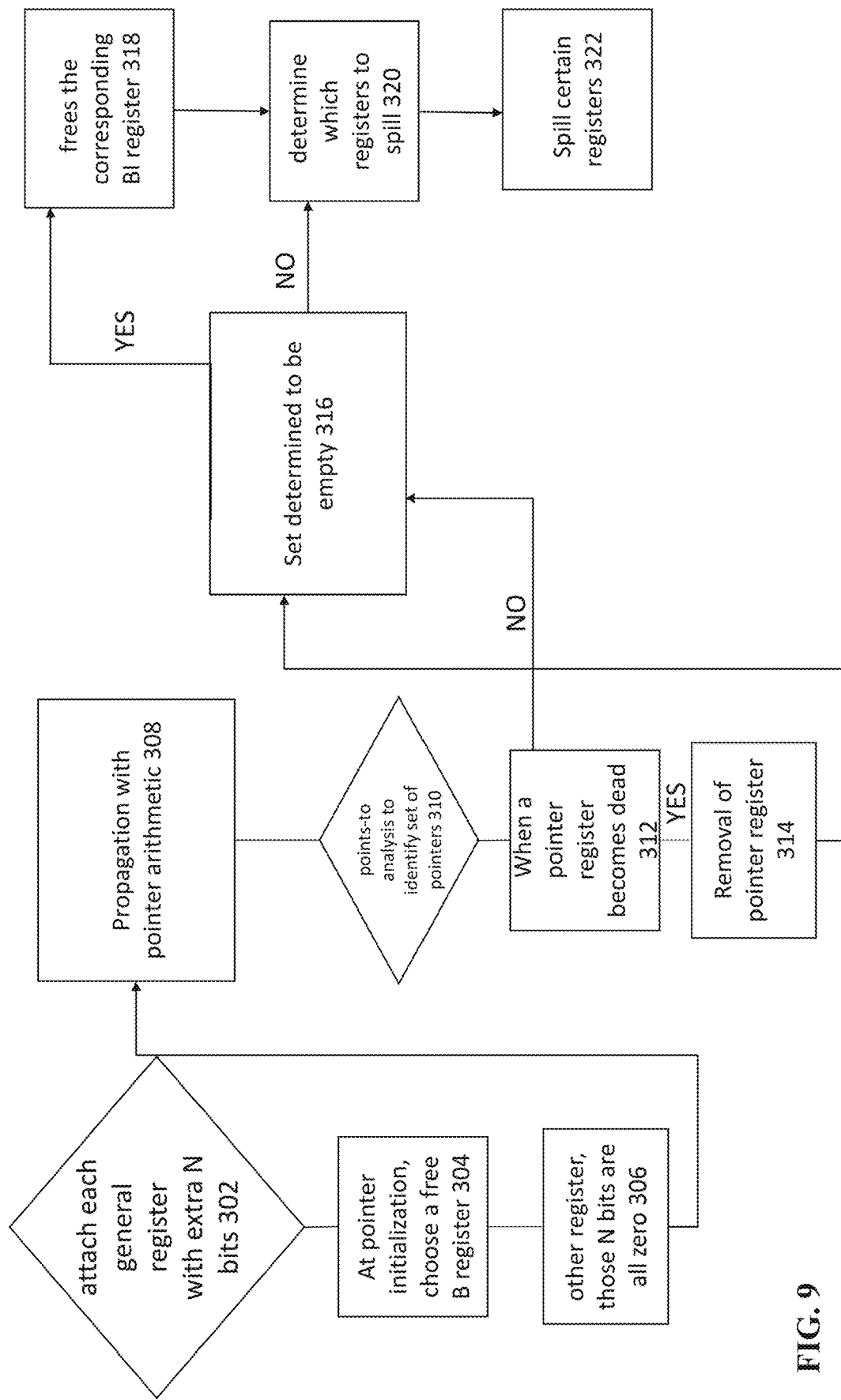
FIG. 9 illustrates an alternative implementation of mapping.

FIG. 9 illustrates an alternative implementation of mapping.

The system 100 can attach each general register of the general register file 16 with extra N bits. The extra N bits can be used to index $2^N$ bound registers, where N is an integer (step 302).

$FB(R_i)=B_j$, j is the value of the extra N bits attached to $R_i$

The mapping is maintained as follows. At pointer initialization, choose a free B (BI) register and record the index of this B (BI) register in the N bits of general register for the pointer 304. For all the other registers, the N bits should indicate the B (BI) registers that those other registers are associated with. 306.

Propagation with pointer arithmetic by selecting the non-zero value of the extra bits from operands 308. One of the key issues becomes how to free BI register or spill the BI register of the BI register file 18.

The system 100 frees BI register of the BI register file 18 with instruction inserted by the compiler as follows. For instruction to free register. The system 100 uses the mapped register file and needs free instruction to free BI register from BI register file 18. If one-to-one mapping is used, the free instruction is not needed and the hardware can maintain the BI register files 18. The system 100 uses points-to analysis to identify set of pointers for each BI register: (B1: {R2, R4}) (step 310).

When it is determined that a pointer register 60 becomes dead (by data flow analysis) 312, the system 100 removes it from the register set 314.

If the register set is determined to be about to be empty 316, the system frees the corresponding BI register 18 (step 318). Another way is to identify which BI registers are still live by scanning all the live pointers (at the beginning or end of the function) and free the others at step 318.

The system 100 spills out the BI register 18 when a determination is made that there is not enough 320. Assume KS is the set of registers should be kept (minimum of two BI registers for next instruction)

If FB(Rx) !=FB(Ry), for all Ry in KS, spill Rx out
Remember all Rz that FB(Rz)=FB(Rx) for restore The system then makes the selection of which register to spill using the methods used for register spill combined with points-to analysis result 322.

Figure 10A:
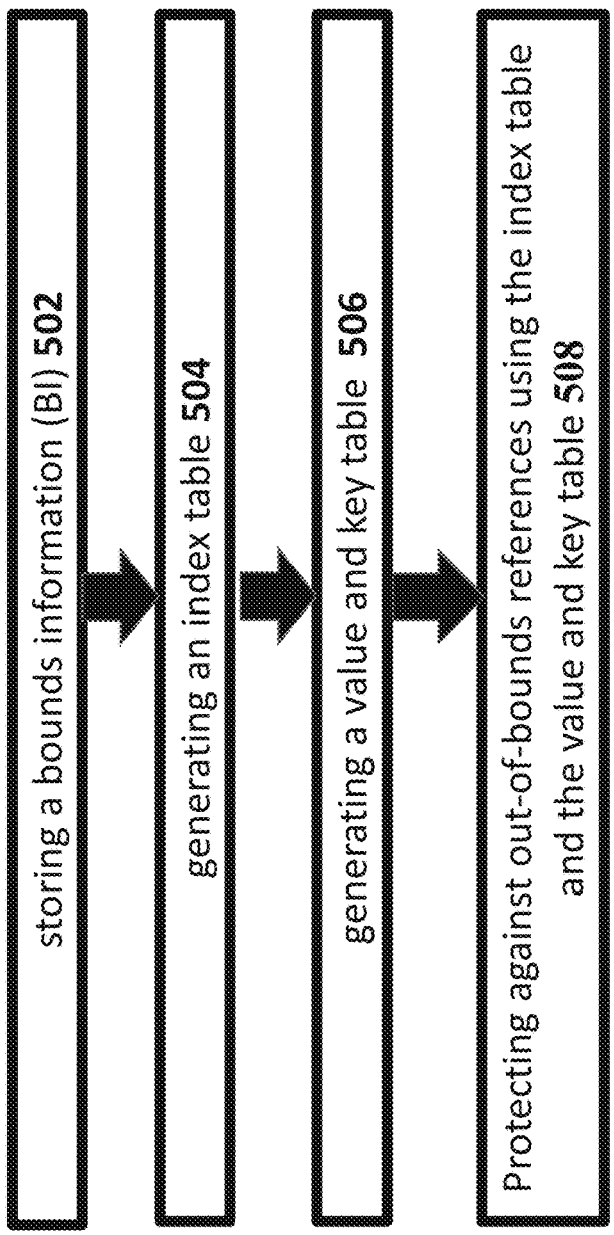
FIG. 10A illustrates a method of an embodiment of the present invention.

FIG. 10A illustrates a method of an embodiment of the present invention.

The system 100 stores bounds information (BI) in registers in a bound register file 18 (step 502). The bounds information is mapped with the general register file 16. The bounds information includes a start address and length for each buffer.

The system 100 then generates an index table 28 from the bounds information from the bound register file 18 into a memory 20 (step 504). The index table 28 is accessed by an index. Each entry of the index table 28 includes a starting address 40 and length 42 of the buffer.

The system 100 also generates a value/key table 30 in the memory 20 from the bounds information (step 506). The value/key table 30 is accessed with a pointer value 64 as the key 50. Each entry of the value/key table 30 includes a key 50 of a pointer value 62, starting address 52 and length of the buffer 54. The bounds information for a pointer can be located from original instructions.

The system 100 protects against out-of-bounds references using the index table 28 and the value/key table 30 (step 508). A processor or CPU Core 10 includes a bound processing unit 20 that executes operations for the protection against out-of-bounds references.

Therefore, the present invention introduces a dedicated register file to hold bound information for active pointers, which are in general registers. The present invention maintains a mapping from a general register of the general register file 16 to a bound register of the bound register file 18 so that the bound-checking related operation can be performed with the original instructions. The number of instructions to be added for bound checking is greatly reduced by the present invention. Also introduced is special hardware to execute the bound checking related operations for instructions. Also, with bound information registers of the bound information register file 18, the latency of most instructions will not increase when bound checking operation is added to them.

Therefore, the present invention is able to provide precise protection where the system 100 protects every buffer and precision is down to byte. The present invention is applicable on legacy programs such as C/C++ applications, including arbitrary pointer arithmetic and number of buffers to be protected in one application may range from thousands to millions.

FIG. 10B illustrates a method of an embodiment of the present invention.

The method for protecting out-of-bounds references stated in another way, includes the following. When a buffer is allocated, the system 100 stores an address of the buffer in a general purpose register from a general register file 16 and stores bounds information (BI) for the buffer in a bounds information register from a bound register file 18 (step 510). When the content of the general purpose register from the general register file 16 is used as an address in a load or store operation, the system 100 uses the content of the bounds information register of the bound register file 18 to determine if the load or store is out of bounds (step 512).

Different features shown in different figures from FIGS. 1 through 10 can be combined, changed or switched between the different examples. The system 100 shown in FIGS. 1 through 10 can also be implemented in hardware and software shown in FIGS. 11 through 15.

Figure 11:
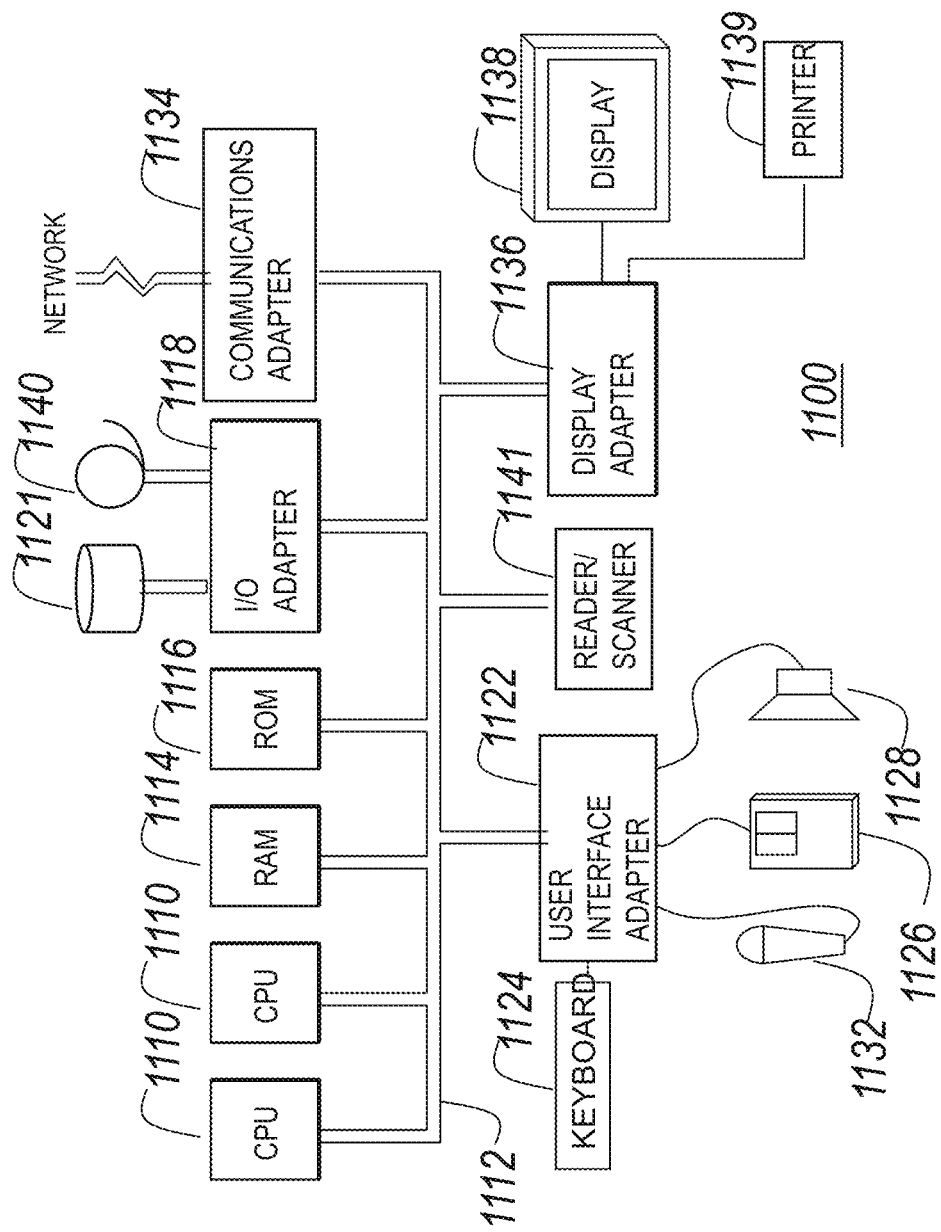
FIG. 11 illustrates an exemplary hardware/information handling system for incorporating the example embodiment of the present invention therein.
Figure 12:
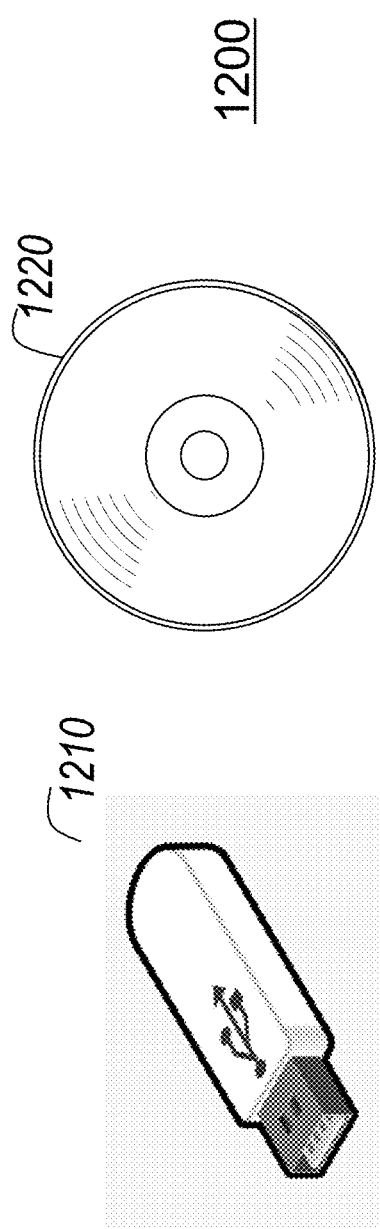
FIG. 12 illustrates a signal-bearing storage medium for storing machine-readable instructions of a program that implements the method according to the example embodiment of the present invention.

FIG. 11 illustrates another hardware configuration of the system, where there is an information handling/computer system 1100 in accordance with the present invention and which preferably has at least one processor or central processing unit (CPU) 1110 that can implement the techniques of the invention in a form of a software program for software intelligence as-a-service.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a flash memory 1210 or optical storage diskette 1220 (FIG. 12), directly or indirectly accessible by the CPU 1110.

Whether contained in the flash memory 1210, the optical disk 1220, the computer/CPU 1110, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
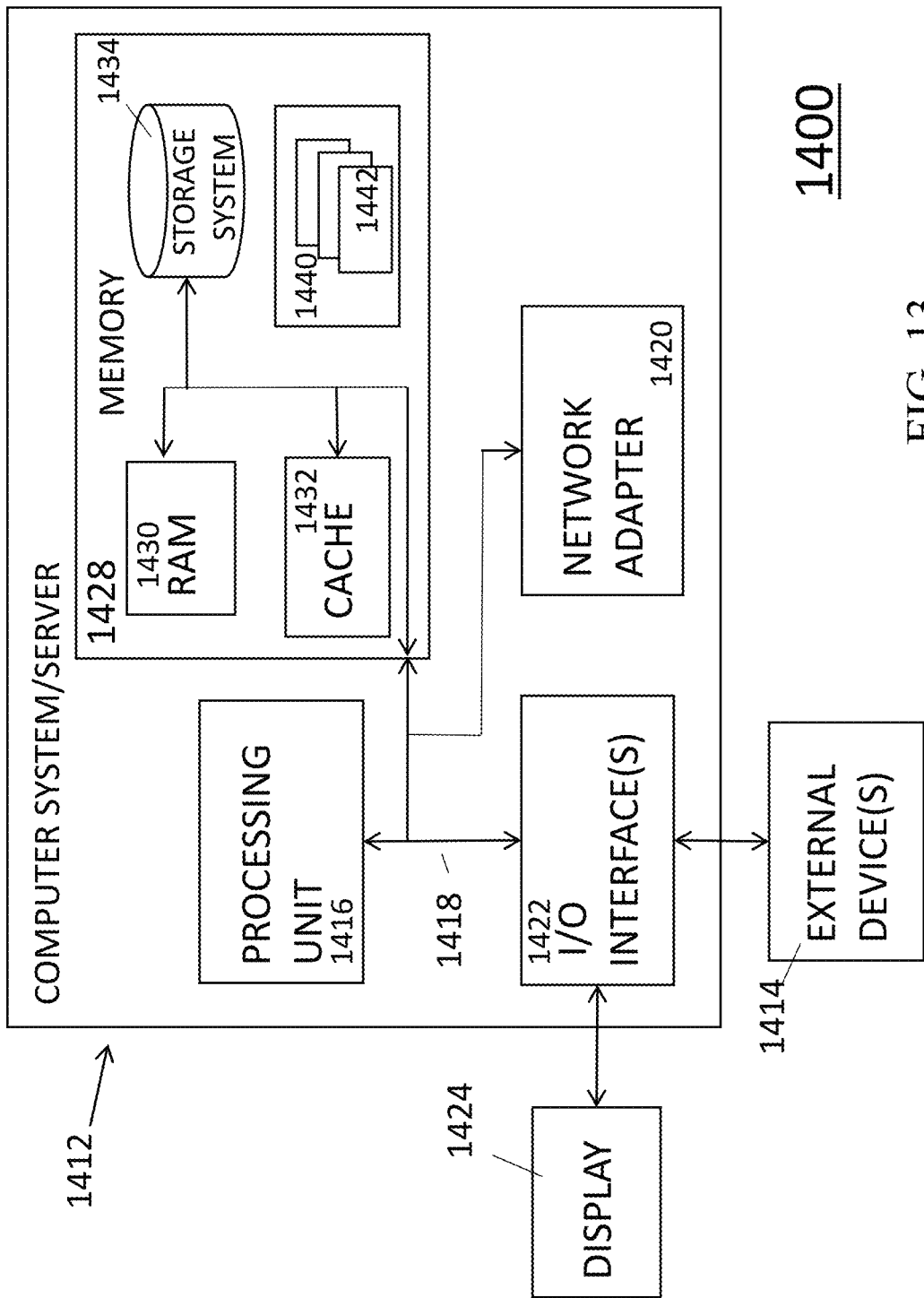
FIG. 13 depicts a cloud computing node according to an example embodiment of the present invention.

Referring now to FIG. 13, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove. As mentioned previously, system 100 of FIG. 1 can be implemented in a cloud infrastructure such as FIG. 13 (and also FIGS. 14 and 15). In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 14:
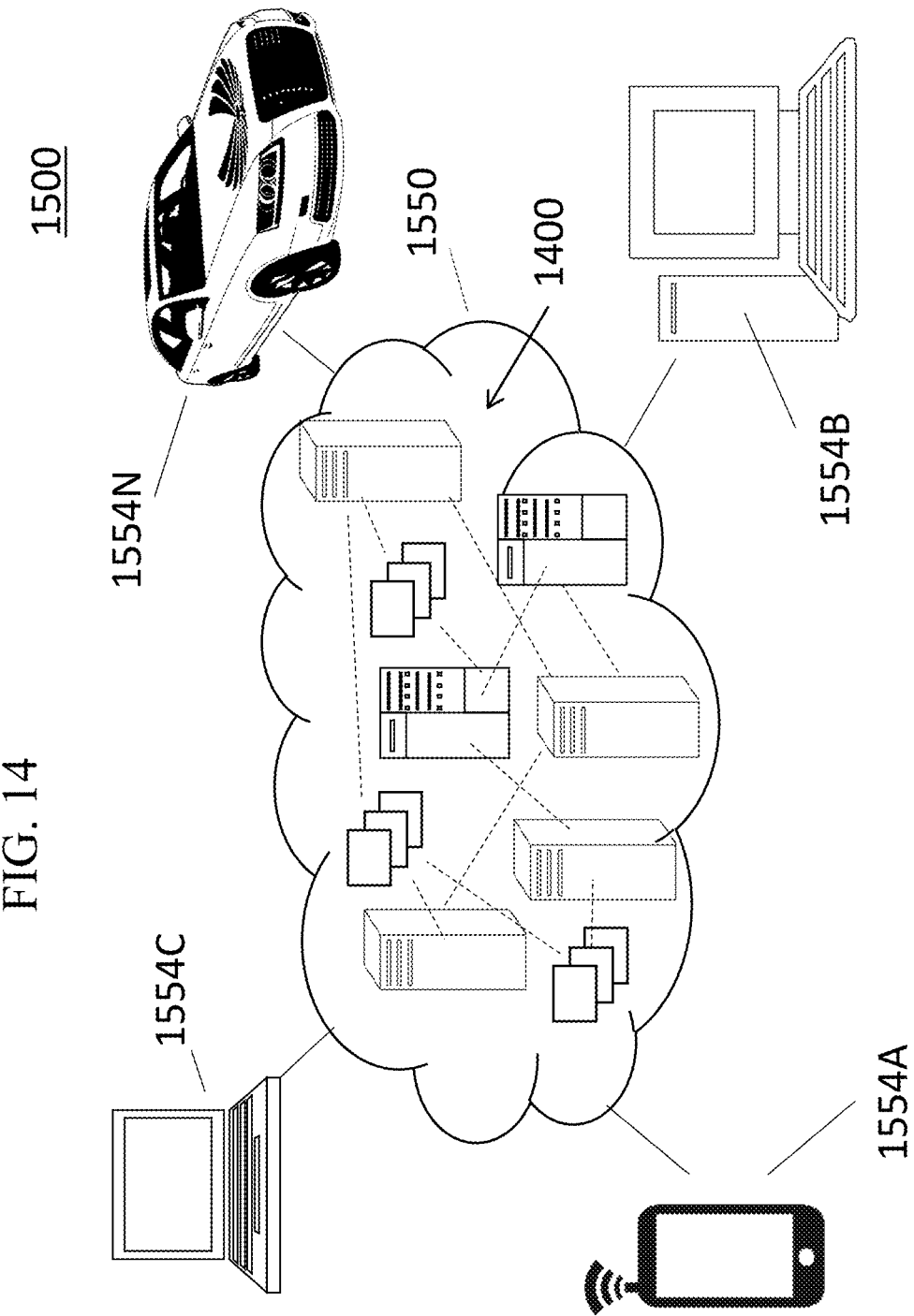
FIG. 14 depicts a cloud computing environment according to an example embodiment of the present invention.

Referring now to FIG. 14, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 16 are intended to be illustrative only and that computing nodes 1400 and cloud computing environment 1550 can communicate with any type of computerized device over any type of network and/or network addressable connection (e.g., using a web browser).

Figure 15:
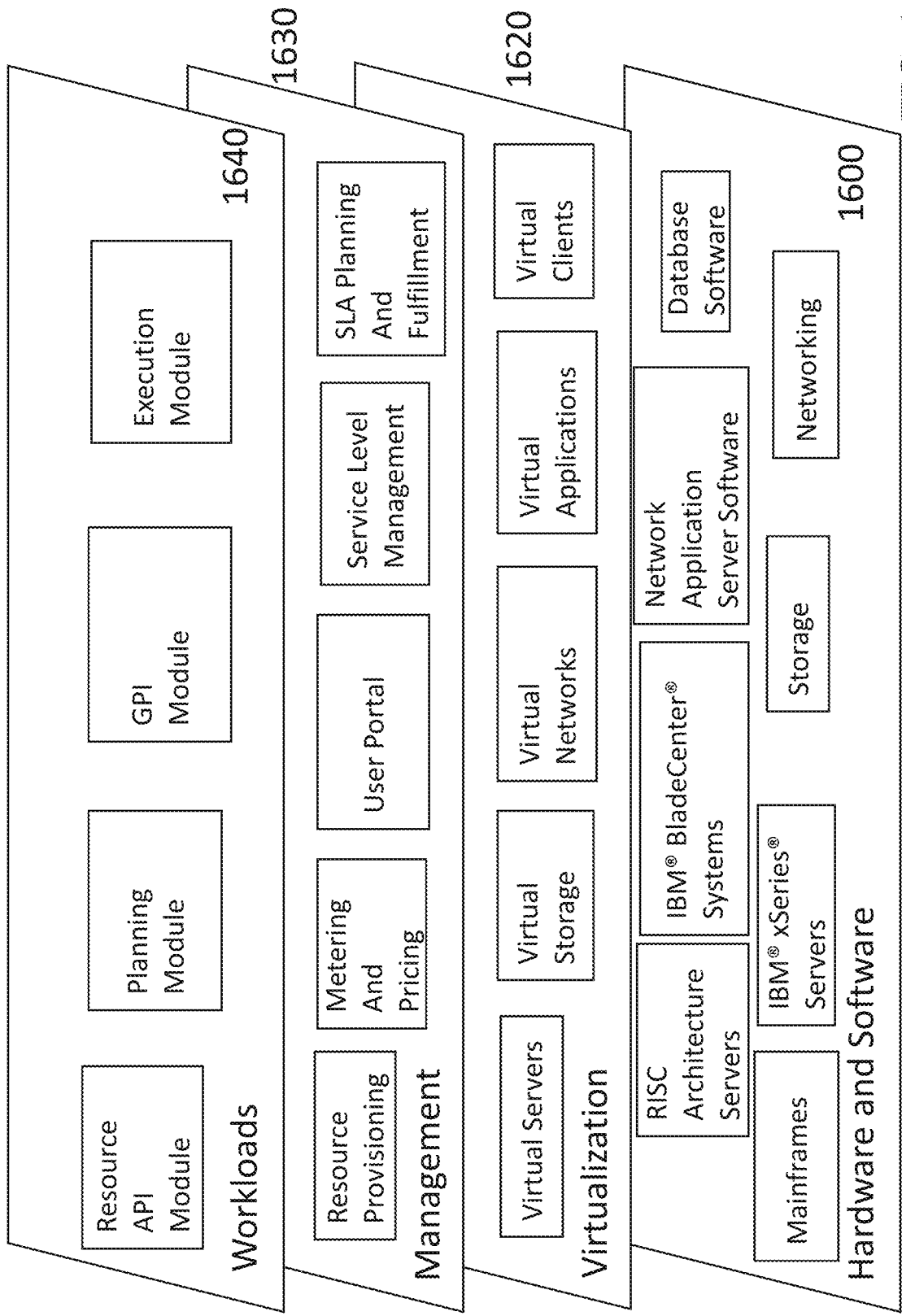
FIG. 15 depicts abstraction model layers according to an example embodiment of the present invention.

Referring now to FIG. 15, a set of functional abstraction layers provided by cloud computing environment 1550 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1600 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of protecting against out-of-bounds references, comprising:
    storing an address of a buffer in a general register and storing bounds information (BI) for the buffer in a bounds information register; and
    when a content of the general register is referenced to as an address in a load or store operation, using a content of the bounds information register comprising the bounds information (BI) for the buffer to determine when the load or store operation is out of bounds.

2. The method according to claim 1, further comprising: storing the bounds information in the bounds information register in a bounds information register file;
    generating an index table in a memory from the bounds information;
    generating a value and a key table in the memory from the bounds information; and
    protecting against the out-of-bounds references using the index table and the value and key table.

3. The method according to claim 1, comprising when a first address in the general register is used to compute a second address in an array indexing or pointer arithmetic, the bounds information for the first address is used as the bounds information for the second address.

4. The method according to claim 2, wherein which one of the index table or the value and key table is accessed is based on heuristics,
    wherein the index table is accessed by an index,
    wherein each entry of the index table includes a starting address and a length of the buffer, and
    wherein the bounds information is mapped with the general register.

5. The method according to claim 2, wherein the value and key table is accessed with a pointer value as a key, and
    wherein each entry of the value and key table includes a key of a pointer value, a starting address and a length of the buffer.

6. The method of claim 1, wherein the bounds information includes a starting address and a length for each buffer,
    wherein the bounds information for a pointer can be located from original instructions, and
    wherein a processor includes a bound processing unit that executes operations for the protecting against out-of-bounds references.

7. The method according to claim 1, comprising:
    when the address in the general register is assigned to a second general register, the bounds information for a first register is used as the bounds information for a second register; and
    storing the bounds information in the bounds information register in a bounds information register file.

8. A system for protecting against out-of-bounds references, comprising:
    a memory storing computer instructions; and
    a processor configured to execute the computer instructions to:
    store an address of a buffer in a general register and storing bounds information (BI) for the buffer in a bounds information register; and
    when a content of the general register is used as an address in a load or store operation, use a content of the bounds information register to determine when the load or store operation is out of bounds.

9. The system according to claim 8, further comprising the processor configured to execute the computer instructions to:
    store the bounds information in the bounds information register in a bounds information register file;
    generate an index table in the memory from the bounds information;
    generate a value and a key table in the memory from the bounds information; and
    protect against out-of-bounds references using the index table and the value and the key table.

10. The system according to claim 8, comprising when a first address in the general register is used to compute a second address in an array indexing or pointer arithmetic, the bounds information for the first address is used as the bounds information for the second address.

11. The system according to claim 9, wherein which one of the index table or the value and key table is accessed is based on heuristics,
   wherein the index table is accessed by an index,
   wherein each entry of the index table includes a starting address and a length of a buffer, and
   wherein the bounds information is mapped with the general register.

12. The system according to claim 9, wherein the value and key table is accessed with a pointer value as a key, and
   wherein each entry of the value and key table includes a key of a pointer value, starting address and a length of a buffer.

13. The system according to claim 8, wherein the processor includes a bound processing unit that executes operations for the protecting against out-of-bounds references,
   wherein the bound information includes a start address and a length for each buffer, and
   wherein the bound information for a pointer can be located from original instructions.

14. The system according to claim 8, comprising when the address in the general register is assigned to a second general register, the bounds information for a first register is used as the bounds information for a second register,
   wherein the bounds information is mapped with the general register,
   wherein a value and a key table generated from the bounds information is accessed with a pointer value as a key,
   wherein the bounds information includes a starting address and a length for each buffer, and
   wherein the general register is separate from the bounds information register dedicated to storing the bounds information.

15. A computer program product for protecting against out-of-bounds references, the computer program product comprising a computer readable storage medium having program instructions embodied therewith, the program instructions readable and executable by a computer to cause the computer to perform a method, comprising:
   storing an address of a buffer in a general register and storing bounds information (BI) for the buffer in a bounds information register; and
   when a content of the general register is used as an address in a load or store operation, using a content of the bounds information register to determine if the load or store operation is out of bounds.

16. The computer program product according to claim 15, further comprising:
   storing the bounds information in the bounds information register in a bounds information register file;
   generating an index table in a memory from the bounds information;
   generating a value and a key table in the memory from the bounds information; and
   protecting against out-of-bounds references using the index table and the value and key table.

17. The computer program product according to claim 15, comprising when a first address in the general register is assigned to a second general register or used to compute a second address in array indexing or pointer arithmetic, the bounds information for the first address is used as the bounds information for the second general register.

18. The computer program product according to claim 16, wherein which one of the index table or the value and key table is accessed is based on heuristics,
   wherein the index table is accessed by an index,
   wherein each entry of the index table includes a starting address and a length of the buffer, and
   wherein the bounds information is mapped with the general register.

19. The computer program product according to claim 16,
   wherein a processor includes a bound processing unit that executes operations for the protecting against out-of-bounds references,
   wherein the value and key table is accessed with a pointer value as a key, and
   wherein each entry of the value and key table includes a key of a pointer value, a starting address and a length of the buffer.

20. The computer program product according to claim 15, wherein the bounds information includes a start in address and length for each buffer, and
   wherein the bound information for a pointer can be located from original instructions.

* * * * *